Patented Feb. 21, 1928.

1,659,997

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.   Application filed June 17, 1926. Serial No. 116,738.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottom of oil storage tanks and are commonly referred to as "cut oil", "roily oil", "emulsified oil" and "bottom settlings".

In our pending application for Patent Serial No. 59,954, filed October 1, 1925, we have described a process for breaking or separating petroleum emulsions of the kind referred to, that is distinguished from prior processes used to break such emulsions, in that it contemplates subjecting the emulsions to the action of a treating agent consisting of a mixture comprising a condensation product containing a sulpho-aromatic, soap-forming acid in which the sulphonic group is joined directly to the non-carboxyl end of the aliphatic hydrocarbon chain.

We have discovered that when the treating agent contemplated by the process described in our said application for patent is produced on a commercial scale, that a mechanical mixture of allied bodies is obtained, which mixture, in addition to containing a condensation product containing a sulpho-aromatic, soap-forming acid in which the sulphonic group is joined directly to the non-carboxyl end of the aliphatic hydrocarbon chain, also contains certain complex, sulpho-aromatic, soap-forming bodies, which, while lacking the distinguishing characteristic of the treating agent contemplated by our said process, are of equal or greater value as agents for treating petroleum emulsions.

Our present invention consists of a process for breaking or separating emulsions of mineral oil and water that is similar to the process described in our said pending application, but which is differentiated from same by the use of a treating agent consisting of a mixture comprising a condensation product containing a sulpho-aromatic, soap-forming acid and other complex organic bodies, produced by the reaction between an aromatic, sulpho-soap-forming acid, and an organic, soap-forming group which is susceptible to chemical reaction with sulphuric acid. The expression "condensation product" has been used because the chemical reactions involved in part contemplate dehydration as is illustrated in the formation of an ester or a lactone.

In view of the difficulty of analyzing such complex organic bodies to determine their chemical composition, we will define the treating agent contemplated by our present process by the method employed to produce said agent, as this will enable those skilled in the art to understand and practice our invention, and moreover, will clearly define the metes and bounds of the invention.

The method employed to produce the treating agent contemplated by our present process consists in subjecting a soap-forming organic group, characterized by the ability to react with sulphuric acid, to the action of an aromatic, sulpho-soap-forming acid. By the expression "soap-forming group" it is meant to denote those organic groups which combine with soluble hydrates to give soap-like detergents. These substances are fatty substances, such as oleic acid; resinous substances, such as rosin; and mineral oil acids, such as naphthenic acid. These soap-forming groups are characterized by having an unsaturated, double bond, such as oleic acid, or an hydroxyl group, such as ricinoleic acid, and thus sulphuric acid is absorbed directly by chemical reaction. We have discovered that these substances which are susceptible to reaction or sulphonation by sulphuric acid, are also susceptible to direct combination with a sulpho-soap-forming-aromatic acid. By the expression "susceptible to reaction or sulphonation by sulphuric acid" we mean reactions similar to those which are the basis of certain fatty industries, namely, the production of candle material, the production of turkey red oil, the production of Twitchell reagents, etc. In general, these reactions are concerned with the reaction of sulphuric acid at the double bond, or with the hydroxyl group or with the splitting of water. It is not meant to include, by the expression just referred to the charring or oxidation effect which sulphuric acid at elevated temperatures produces on substantially all organic matter. The aromatic, sulpho-soap-forming acid may be derived from any of the coal tar products, such as benzene, toluene, zylene, cresol, phenol, naphthalene, naphthol, anthracene, tetralin, etc. The production of those acids which are akin to Twitchell reagents from these substances is well known commercially and is a known state of the art. In essence it consists in subjecting the soap-forming material and the aromatic material to the action of sulphuric acid of various strengths and various temperatures and in various degrees of excess reagent. Sulphonated aromatics may be employed, and under certain conditions, they will react in the absence of sulphuric acid.

An organic soap-forming material characterized by being susceptible to reaction by sulphuric acid is mixed with one or more molecular parts of the selected aromatic sulpho-soap-forming acid, and after intimate mixture, it is heated until reaction takes place. We prefer to use naphthalene as a source of the aromatic, because naphthalene is relatively cheap. Combined with a naphthalene we prefer to use castor oil, due to the ease of reaction and economy in obtaining a sulpho-aromatic fatty acid. We prefer to combine this material by heating with a mixture of oleic acid and hydroxy-stearic acid, because said mixture has the advantage of exhibiting both an unsaturated double bond and an hydroxyl group. The product of reaction thus obtained is complex naphthalene oleo-ricinoleo sulphonic acids.

The above reactions produce a condensation product of an acidic character, and in using such products, we prefer to use the water-soluble salts obtained by neutralization of the acidic material by means of caustic soda, potash or ammonia. However, the water-insoluble salts, such as calcium or magnesium salts, or the esters, such as the methyl or ethyl ester, can be employed. These materials can be used directly in undiluted form or in dilute form, and when diluted, water or oil is the most desirable solvent to use.

In practicing our process the treating agent, consisting of a substance of the character above described, is brought into contact with an emulsion, either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds the sludge obtained from the bottom of an oil storage tank. The treating agent can even be introduced into a producing well in such a way that it will become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature, so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or electrical dehydrator, or an emulsifying device, with or without the addition of water to the emulsion, or it may be subjected to action by a combination of two or more of the devices above referred to.

Having thus described our invention, what we claim and desire to secure by Letters Patent is:

1. A process for breaking or separating petroleum emulsions, characterized by subjecting the emulsion to the action of a treating agent consisting of a mixture comprising a condensation product containing a sulpho-aromatic, soap-forming acid and other complex organic bodies, produced by the reaction between an aromatic sulpho-soap-forming acid and an organic soap-forming group which is susceptible to chemical reaction with sulphuric acid.

2. A process for breaking or separating petroleum emulsions, characterized by subjecting the emulsion to the action of a treating agent consisting of a mixture comprising a condensation product containing a sulpho-aromatic, soap-forming group and other complex organic bodies, produced by the reaction between an aromatic sulpho-soap-forming acid and a fatty group which is susceptible to chemical reaction with sulphuric acid.

3. A process for breaking or separating petroleum emulsions, characterized by subjecting the emulsion to the action of a treating agent consisting of a mixture comprising a condensation product containing a sulpho-aromatic, soap-forming group and other complex organic bodies, produced by the reaction between an aromatic sulpho-fatty acid and a fatty group which is susceptible to chemical reaction with sulphuric acid.

4. A process for breaking or separating petroleum emulsions, characterized by subjecting the emulsion to the action of a treating agent consisting of a mixture comprising a condensation product containing the salts of a sulpho-aromatic, soap-forming acid and other complex organic bodies, produced by the reaction between an aromatic sulpho-fatty acid and a fatty group which is susceptible to chemical reaction with sulphuric acid.

5. A process for breaking or separating petroleum emulsions, characterized by subjecting the emulsion to the action of a treating agent consisting of a mixture comprising a condensation product containing the water-soluble salts of a sulpho-aromatic, soap-forming group and other complex organic bodies, produced by the reaction between an aromatic sulpho-fatty acid and a fatty group which is susceptible to chemical reaction with sulphuric acid.

6. A process for breaking or separating petroleum emulsions, characterized by subjecting the emulsion to the action of a treating agent consisting of a mixture comprising a condensation product containing the ammonium salts of a sulpho-aromatic, soap-forming group and other complex organic bodies, produced by the reaction between an aromatic sulpho-fatty acid and a fatty group which is susceptible to chemical reaction with sulphuric acid.

MELVIN DE GROOTE.
WILBUR C. ADAMS.